United States Patent
Park et al.

(10) Patent No.: US 10,818,959 B2
(45) Date of Patent: Oct. 27, 2020

(54) CAP ASSEMBLY HAVING IMPROVED STABILITY AND CYLINDRICAL SECONDARY BATTERY INCLUDING THE SAME

(71) Applicant: LG Chem, Ltd., Seoul (KR)

(72) Inventors: Pil Kyu Park, Daejeon (KR); Joo Hwan Sung, Daejeon (KR); Jung Koo Kang, Daejeon (KR); Je Jun Lee, Daejeon (KR); Han Gab Song, Daejeon (KR); Yeo Min Yoon, Daejeon (KR)

(73) Assignee: LG Chem, Ltd. (KR)

( * ) Notice: Subject to any disclaimer, the term of this patent is extended or adjusted under 35 U.S.C. 154(b) by 169 days.

(21) Appl. No.: 15/575,653

(22) PCT Filed: Jul. 21, 2016

(86) PCT No.: PCT/KR2016/007949
§ 371 (c)(1),
(2) Date: Nov. 20, 2017

(87) PCT Pub. No.: WO2017/014576
PCT Pub. Date: Jan. 26, 2017

(65) Prior Publication Data
US 2018/0123163 A1    May 3, 2018

(30) Foreign Application Priority Data

Jul. 21, 2015  (KR) .................. 10-2015-0103289
Jul. 20, 2016  (KR) .................. 10-2016-0092223

(51) Int. Cl.
*H01M 2/08* (2006.01)
*H01M 2/34* (2006.01)
(Continued)

(52) U.S. Cl.
CPC ......... *H01M 10/052* (2013.01); *H01M 2/046* (2013.01); *H01M 2/0447* (2013.01);
(Continued)

(58) Field of Classification Search
CPC .......... H01M 2/04–0495; H01M 2/08; H01M 2/12–1241; H01M 10/05–0525
See application file for complete search history.

(56) References Cited

U.S. PATENT DOCUMENTS

| 5,656,392 A | 8/1997 | Sano et al. |
| 6,025,091 A * | 2/2000 | Kondo .................. H01M 2/08 429/174 |

(Continued)

FOREIGN PATENT DOCUMENTS

| CN | 103650199 A | 3/2014 |
| CN | 103946250 A | 7/2014 |

(Continued)

OTHER PUBLICATIONS

Machine Translation of Aoyama (JP 2013-177574) (Year: 2013).*
(Continued)

*Primary Examiner* — Jonathan Crepeau
*Assistant Examiner* — Jacob Buchanan
(74) *Attorney, Agent, or Firm* — Lerner, David, Littenberg, Krumholz & Mentlik, LLP

(57) ABSTRACT

The present invention relates to a cap assembly formed of a composite of cap assembly ceramic for the cylindrical battery and mounted on a top end portion of the cylindrical secondary battery in which an electrode assembly is placed in a cylindrical can, which includes a safety vent having a predetermined notch configured to be ruptured by high pressure gas generated in the battery, a current interrupt device coupled to a lower end of the safety vent and blocking a current when an internal pressure of the battery rises, and a gasket for the current interrupt device surrounding an outer circumferential surface of the current interrupt device, wherein the gasket for the current interrupt device comprises a polymer resin having a melting point of 250° C. or more and a heat deflection temperature (HDT) of 200° C.

(Continued)

or more, and a cylindrical secondary battery including the same.

11 Claims, 10 Drawing Sheets

(51) Int. Cl.
  *H01M 2/04*  (2006.01)
  *H01M 2/12*  (2006.01)
  *H01M 10/052*  (2010.01)
  *H01M 10/0525*  (2010.01)

(52) U.S. Cl.
  CPC ........... *H01M 2/08* (2013.01); *H01M 2/1241* (2013.01); *H01M 2/345* (2013.01); *H01M 10/0525* (2013.01); *H01M 2200/20* (2013.01)

(56) References Cited

U.S. PATENT DOCUMENTS

| | | | |
|---|---|---|---|
| 2010/0273047 A1* | 10/2010 | Kunoike | H01M 2/0413 429/181 |
| 2011/0104523 A1 | 5/2011 | Lee et al. | |
| 2012/0282504 A1 | 11/2012 | Kim et al. | |
| 2013/0273401 A1 | 10/2013 | Lee et al. | |

FOREIGN PATENT DOCUMENTS

| | | | | |
|---|---|---|---|---|
| JP | 2003017130 A | | 1/2003 | |
| JP | 2006147268 A | | 6/2006 | |
| JP | 3985805 B2 | | 10/2007 | |
| JP | 2011071003 A | | 4/2011 | |
| JP | 2013177574 A | * | 9/2013 | .......... C08F 214/262 |
| JP | 2014524118 A | | 9/2014 | |
| KR | 20090022418 A | | 3/2009 | |
| KR | 20110105953 A | | 9/2011 | |
| KR | 20130009691 A | | 1/2013 | |
| WO | WO-2013/115374 | * | 8/2013 | .............. H01M 2/08 |

OTHER PUBLICATIONS

Search report from International Application No. PCT/KR2016/007949, dated Oct. 21, 2016.
Chinese Search Report for Application No. 201680033777.5, dated Mar. 30, 2020, pp. 1-2.

* cited by examiner

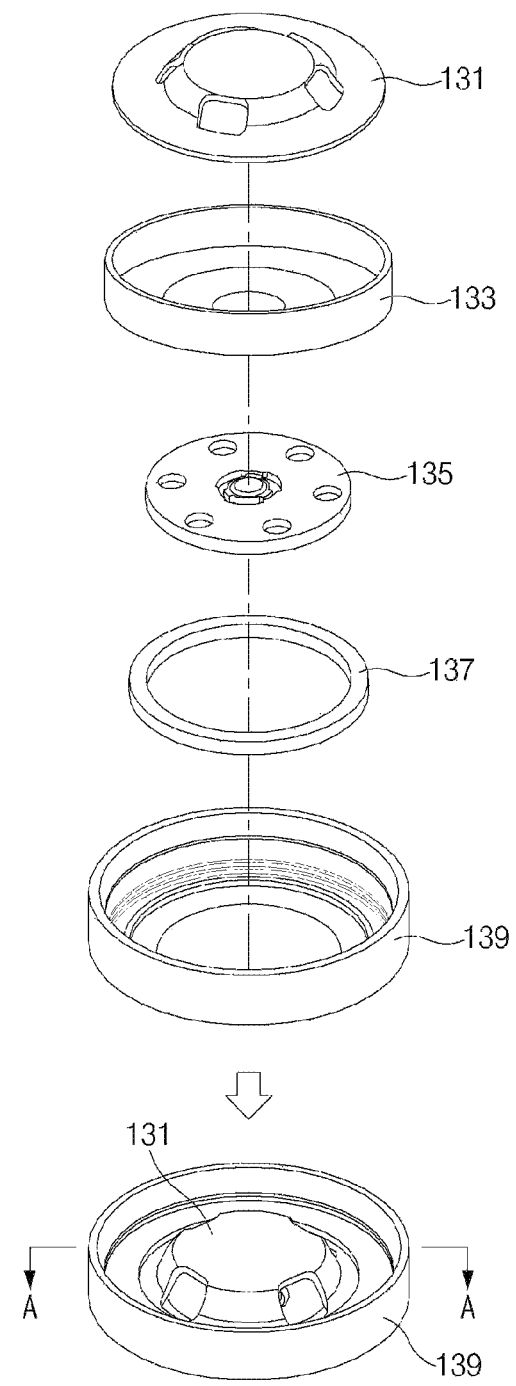

CAP ASSEMBLY HAVING IMPROVED STABILITY AND CYLINDRICAL SECONDARY BATTERY INCLUDING THE SAME

CROSS-REFERENCE TO RELATED APPLICATIONS

This application is a national phase entry under 35 U.S.C. § 371 of International Application No. PCT/KR2016/007949, filed Jul. 21, 2016, which claims the benefit of Korean Patent Application Nos. 10-2015-0103289, filed on Jul. 21, 2015, and 10-2016-0092223, filed on Jul. 20, 2016, the disclosures of which are incorporated herein in their entirety by reference.

TECHNICAL FIELD

The present invention relates to a cap assembly, in which stability is improved by including a current interrupt device (CID) gasket that is formed of a polymer resin having a high softening point, and a cylindrical secondary battery including the same.

BACKGROUND ART

Demand for secondary batteries as an energy source has been significantly increased as technology development and demand with respect to mobile devices have increased, and, among these secondary batteries, lithium secondary batteries having high energy density and output characteristics have been commercialized and widely used.

Lithium secondary batteries are classified into a cylindrical battery and a prismatic type battery, in which an electrode assembly is placed in a cylindrical or prismatic metal can, and a pouch type battery, in which an electrode assembly is placed in a pouch type case of an aluminum laminate sheet, according to the shape of a battery case.

The electrode assembly placed in the battery case is a chargeable and dischargeable electric generating element composed of a laminated structure of positive electrode/separator/negative electrode, wherein the electrode assemblies are classified into a jelly-roll type, in which long-sheet type positive electrodes and negative electrodes having active materials respectively coated thereon are wound while disposing a separator therebetween, a stacked type in which pluralities of positive electrodes and negative electrodes having a predetermined size are sequentially stacked in a state in which a separators is disposed therebetween, and a stack and folding type in which unit cells, such as full-cells or bi-cells, are wound with a separation film.

Among the above electrode assemblies, the jelly-roll type electrode assembly is advantageous in that the preparation thereof is easy and energy density per weight is high, and a cylindrical battery, in which the jelly-roll type electrode assembly is placed, is advantageous in that its capacity is relatively high.

FIG. 1 schematically illustrates a vertical sectional perspective view of a general cylindrical battery.

A cylindrical battery 10 is prepared by accommodating a jelly-roll (wound) type electrode assembly 20 in a cylindrical case 30, injecting an electrolyte into the cylindrical case 30, and then coupling a top cap assembly 40, in which an electrode terminal (e.g., positive electrode terminal: not shown) is formed, to an open top end of the case 30.

The electrode assembly 20 has a structure in which a positive electrode 11 and a negative electrode 12 are wound after disposing a separator 13 therebetween, wherein a cylindrical center pin 15 is inserted into a core (center of the jelly-roll) of the electrode assembly. The center pin 15 is generally formed of a metallic material to provide predetermined strength and has a hollow cylindrical structure formed by rolling a sheet. The center pin 15 functions to fix and support the electrode assembly and functions as a passage for discharging gas generated by an internal reaction during charge and discharge and operation.

Meanwhile, most lithium secondary batteries are disadvantageous in that stability is low.

For example, in a case in which the battery is overcharged at about 4.5 V or more, a decomposition reaction of a positive electrode active material occurs, and dendrite growth of lithium metal and a decomposition reaction of the electrolyte occur in the negative electrode. Since heat is accompanied by these processes, the battery may finally ignite and explode while the above-described decomposition reactions and a plurality of side reactions proceed rapidly.

In order to address these limitations, a current interrupt device (hereinafter, referred to as "CID") and a safety vent for blocking a current during abnormal operation of the battery and relieving internal pressure are provided in a space between the electrode assembly and the top cap in the general cylindrical battery.

Top cap assemblies without a positive temperature coefficient (PTC) element are used in high-power cells for power tools, E-bikes, and vacuum cleaners.

FIG. 2 illustrates a structure of the top cap assembly 40 without a PTC element.

As illustrate in FIG. 2, the top cap assembly 40 without a PTC element is composed of a top cap 41 disposed on a topmost end of an upper opening of the secondary battery, a safety vent 50, in which a plurality of notches, which are to be fractured when a voltage exceeding a CID allowable voltage is generated, are formed to discharge gas inside the battery, a CID filter 55, which blocks the current by being ruptured when a pressure inside the battery rises, at a lower end of the safety vent, and a CID gasket 70 surrounding and sealing an outer circumferential surface of the CID filter 55.

With respect to the top cap assembly without the PTC element, the current must be cut off after the CID operates during an external short circuit, but a high current is reconnected as illustrated in FIG. 5 while the CID gasket, which is formed in a surrounding shape to fix the CID, melts, and, as a result, a current of J/R is continuously applied and an internal temperature of the cylindrical secondary battery is continuously increased so that explosion or ignition may occur.

PRIOR ART DOCUMENTS

Japanese Patent No. 3985805

DISCLOSURE OF THE INVENTION

Technical Problem

The present invention provides a cap assembly which includes a CID gasket having improved heat resistance.

Also, the present invention provides a cylindrical secondary battery in which safety may be secured by including the cap assembly.

Technical Solution

According to an aspect of the present invention, there is provided a cap assembly for a cylindrical secondary battery, which is mounted on a top end portion of the cylindrical secondary battery having a structure in which an electrode assembly is placed in a cylindrical can, including: a safety vent having a predetermined notch configured to be ruptured by high pressure gas generated in the battery; a current interrupt device (CID) coupled to a lower end of the safety vent and blocking a current when an internal pressure of the battery rises; and a gasket for the current interrupt device surrounding an outer circumferential surface of the current interrupt device, wherein the gasket for the current interrupt device comprises a polymer resin having a melting point of 250° C. or more and a heat deflection temperature (HDT) of 200° C. or more.

According to another aspect of the present invention, there is provided a cylindrical secondary battery including:

an electrode assembly composed of a negative electrode, a positive electrode, and a separator;

a battery can having an opening at one side thereof and accommodating the electrode assembly and an electrolyte through the opening; and a cap assembly sealing the opening of the battery can, wherein the cap assembly includes a safety vent having a predetermined notch configured to be ruptured by high pressure gas generated in the battery; a current interrupt device coupled to a lower end of the safety vent and blocking a current when an internal pressure of the battery rises; and a gasket for the current interrupt device surrounding an outer circumferential surface of the current interrupt device, and the gasket for the current interrupt device comprises a polymer resin having a melting point of 250° C. or more and a heat deflection temperature (HDT) of 200° C. or more.

Advantageous Effects

According to the present invention, since a CID gasket comprising a high heat resistant polymer resin is formed in a cylindrical secondary battery, melting of the CID gasket may be prevented during an external short circuit due to an increase in internal temperature of the secondary battery, and thus, a cylindrical secondary battery having improved stability may be prepared.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 3A is a schematic view illustrating a stacking process of a top cap assembly for a cylindrical secondary battery of the present invention;

DESCRIPTION OF THE SYMBOLS

Figure 1:
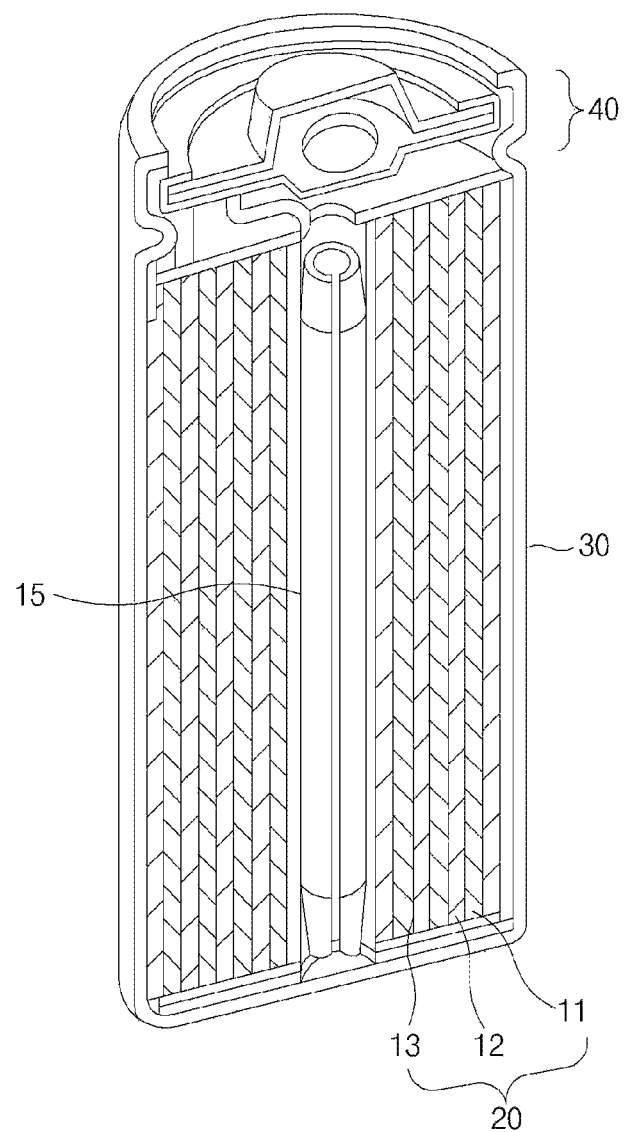
FIG. 1 is a vertical sectional perspective view of a general cylindrical secondary battery.

10: Cylindrical secondary battery
11: Positive electrode
12: Negative electrode
13: Separator
15: Center pin
20: Electrode assembly
30: Cylindrical case
40: Top cap assembly
41, 131: Top cap
50, 133: Safety vent
55, 135: CID filter
70: CID gasket
137: CID gasket
139: Crimping gasket

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Figure 2:
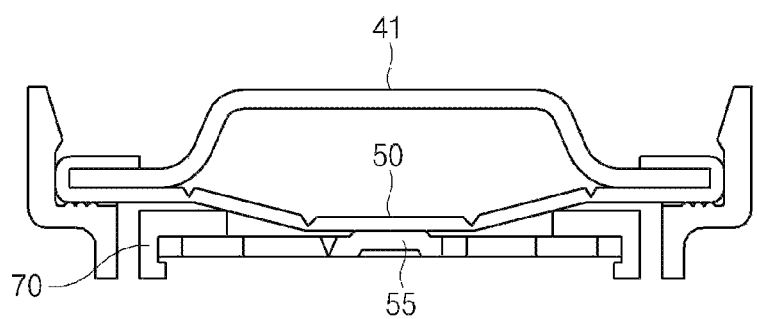
FIG. 2 is a cross-sectional view illustrating a top cap assembly of a cylindrical secondary battery without a PTC element.

As illustrate in FIG. 2, the top cap 41 disposed on a topmost end of an upper opening of a secondary battery, the safety vent 50 for dropping internal pressure which discharges high pressure gas inside the battery, the CID filter 55, as a current interrupt device for blocking a current by being ruptured when the pressure inside the battery rises, at a lower end of the safety vent 50, and the CID gasket 70 surrounding and sealing an outer circumferential surface of the CID filter 55 are coupled to each other in the typical top cap assembly 40 without a PTC element.

Figure 7:
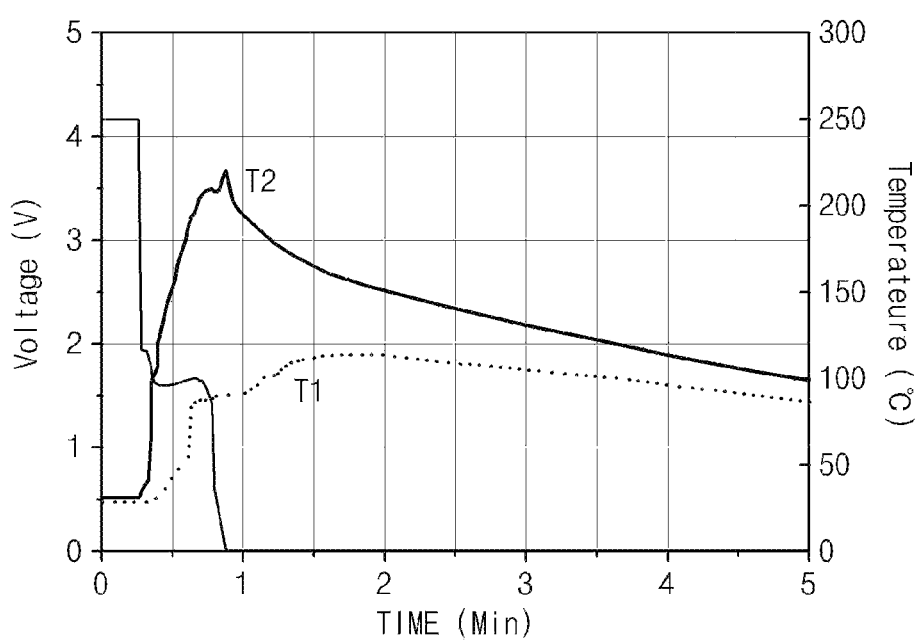
FIG. 7 is a graph showing changes in temperature of a surface of a cell and temperature near a cap assembly during an external short circuit of a conventional secondary battery.

In this case, since the CID gasket is formed of a polypropylene (PP)-based or polybutylene terephthalate (PBT)-based polymer material having a melting point of about 225° C. and a heat deflection temperature (HDT) of about 154° C., the current is reconnected in the top cap assembly 40 without a PTC element during an external shot circuit of the high power cell while the polymer for forming the CID gasket melts, and thus, it is disadvantageous in that an internal temperature of the cylindrical secondary battery is continuously increased. For example, if a temperature at a surface of the cell and a temperature near the cap assembly are measured when the external short circuit is induced at a resistance of 10 mohm, the temperature T1 of the surface of the cell is increased to about 115° C., but the temperature T2 near the cap assembly is increased to about 220° C., which is greater than the heat deflection temperature (HDT) (about 154° C.) of the polymer of the CID gasket material, and thus, the current is connected due to the melting of the CID gasket (see FIG. 7).

Thus, in the present invention, a cap assembly, in which stability is improved by including the CID gasket comprising a polymer resin having a high heat deflection temperature (HDT), and a cylindrical secondary battery including the same are provided.

Specifically, in an embodiment of the present invention, provided is a cap assembly, which is mounted on a top end portion of a cylindrical secondary battery having a structure in which an electrode assembly is placed in a cylindrical can, including:

a safety vent having a predetermined notch configured to be ruptured by high pressure gas generated in the battery; a current interrupt device coupled to a lower end of the safety vent and blocking a current when an internal pressure of the battery rises; and a CID gasket surrounding an outer circumferential surface of the current interrupt device, wherein the CID gasket comprises a polymer resin having a melting point of 250° C. or more and a heat deflection temperature (HDT) of 200° C. or more, or a composite of the polymer resin and ceramic.

In this case, the cap assembly may not include a PTC element.

Also, in an embodiment of the present invention, a cylindrical secondary battery including the cap assembly is provided.

Hereinafter, the cap assembly according to the present invention and the secondary battery including the same according to the embodiment will be described in detail with reference to the accompanying drawings.

Figure 3B:
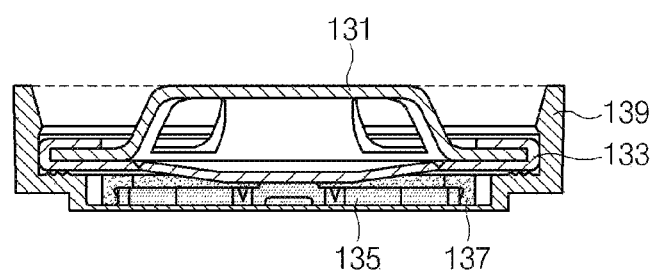
FIG. 3B is a cross-sectional view illustrating a cross section (A-A') of the top cap assembly of FIG. 3A.

FIG. 3A illustrates a schematic view of a stacking process of the top cap assembly of the present invention, and FIG. 3B illustrates a cross-sectional view of a top cap assembly structure prepared by the above process.

The cap assembly of the present invention and the cylindrical secondary battery including the same may be prepared by a conventional method.

Specifically, the cylindrical secondary battery of the present invention is prepared by inserting a jelly-roll electrode assembly into a cylindrical case, injecting an electrolyte thereinto, then mounting a plate-shaped insulating member on a top end of the jelly-roll, and mounting a cap assembly on an open top end of the cylindrical case.

In this case, the cap assembly is disposed on a topmost end of the cylindrical secondary battery and includes a top cap 131 prepared in a shape, in which the center convexly protrudes upward, and a safety vent 133 coupled to a lower end of the top cap 131 as illustrated in FIG. 3A.

The safety vent 133 functions to block a current when a pressure in the battery rises or discharge gas, wherein the safety vent may be formed of a metallic material and a plurality of notches may be formed therein. In a case in which the internal pressure of the cylindrical secondary battery is increased, since the notches are ruptured, the gas in the battery may be discharged outside.

A thickness of the safety vent may vary depending on a material and a structure. The thickness of the safety vent is not particularly limited as long as the safety vent may discharge gas while being ruptured when a predetermined high pressure in the battery is generated and, for example, the thickness may be in a range of 0.2 mm to 0.6 mm.

A CID filter 135 for blocking the current when a high pressure is generated in the cylindrical secondary battery is coupled to a lower end of the safety vent 133.

If a pressure is applied to the safety vent due to an increase in the pressure in the battery, the safety vent is separated from a main body of the current interrupt device while a safety vent protrusion is lifted.

Also, the CID filter 135, as a device that functions to discharge the gas in the battery and to block the current at the same time, is a cylindrical plate member formed of a conductive metallic material, wherein a protrusion, which protrudes upward at the center so as to be welded to the safety vent protrusion, at least two through holes for gas discharge on a concentric circle centering on the protrusion, and a bridge, in which at least two notches connecting the through holes are symmetrically formed, are included, and a fitting portion may be included so that the CID filter may be fitted and fixed in a state in which the CID gasket is included.

In this case, since a total area of the through holes is formed in an amount of about 20% to about 50% based on a total area of the CID filter, an amount of the discharged high pressure gas in the battery may be increased, and thus, a reliable current blocking effect may be achieved. Furthermore, the through holes are spaced apart from each other at an angle of about 50 degrees to about 120 degrees, a shape and a size of each through hole formed are the same, and distances between the through holes are also approximately the same. The CID filter may maintain high mechanical strength while maximizing the amount of the discharged gas due to such a structure.

Also, the CID filter 135 is integrally formed with a CID gasket 137 which has a shape surrounding an outer circumferential surface.

The CID gasket may have a circular ring shape in which an opening that exposes the through holes of the CID filter is included.

A portion of the CID gasket, in which the opening is not formed, is formed to approximately coincide with a shape of the outer circumferential surface of a portion of the CID filter in which the through holes are not disposed.

A typical CID gasket is formed of a polypropylene (PP) resin or a polybutylene terephthalate (PBT) resin.

However, the polybutylene terephthalate (PBT) resin (tensile strength: 48 MPa, elongation: 100%, hardness: R118) has a limitation in that, since the PBT resin exhibits flowability while it melts at high temperature during an external short circuit due to its low melting point (225° C.) and heat deflection temperature (HDT) (150° C.), the PBT resin is recombined with the CID and safety vent to cause a current connection (see FIGS. 5 and 7). Also, in a case in which the CID gasket is formed of a metallic material, there is a limitation in that the CID does not properly operate due to the current connection.

The CID gasket may have excellent chemical resistance to the electrolyte in order to prevent leakage of the electrolyte as well as electrical insulation properties, impact resistance, resilience, and durability.

Since the cylindrical secondary battery of the present invention includes a CID gasket which is prepared by using a polymer resin having a melting point of 250° C. or more and a heat deflection temperature (HDT) of 200° C. or more, flowability of the polymer resin is not exhibited below the melting point even during overheating due to an electrical short circuit in the secondary battery or external environment. Thus, since structural deformation of a portion of the gasket in contact with the cap assembly is suppressed to prevent an additional current flow, safety of the battery may be secured.

Specifically, the polymer resin used in the CID gasket may include at least one selected from the group consisting of a perfluoroalkoxy resin and a thermoplastic polyester elastomer (TPEE) having a weight-average molecular weight of 10,000 to 500,000, particularly 20,000 to 300,000, and more particularly 50,000 to 250,000.

A typical example of the perfluoroalkoxy resin may be a copolymer (PFA) of tetrafluoroethylene (—$C_2F_4$—) and perfluoroalkyl vinyl ether (—$CF_2$—CF(OR)—(where, R is a $C_1$-$C_3$ perfluoroalkyl group)), and, for example, the copolymer of tetrafluoroethylene and perfluoroalkyl vinyl ether may include at least one selected from the group consisting of tetrafluoroethylene-perfluoro(methylvinyl ether)), tetrafluoroethylene-perfluoro(ethylvinyl ether)), and tetrafluoroethylene-perfluoro(propylvinyl ether)) (CAS No. 26655-00-5, melting point: 306° C., heat deflection temperature (HDT): 260° C., tensile strength: 32 MPa, elongation: 410%, hardness: 60 D) represented by the following Formula 1.

[Formula 1]

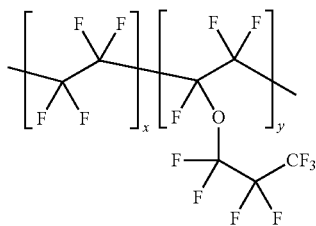

wherein, x and y are integers of 1 to 100.

In a case in which the weight-average molecular weight of the polymer resin satisfies the above range, since the deformation of the gasket structure may be suppressed in the portion in contact with the cap assembly, the additional current flow may be prevented even during the overheating.

The CID gasket may further include a ceramic material.

For example, since a composite of the polymer resin and ceramic may be included as the CID gasket material, air tightness of the gasket may be maintained even under severe conditions of high temperature and high humidity in the battery and high heat resistance may be provided. In this case, the ceramic may include at least one selected from silicon (Si), aluminum (Al), zirconium (Zr), titanium (Ti), and insulating oxides, nitrides, hydroxides, alkoxides, and ketones of each of these, in which a thermal expansion coefficient at a temperature of 200° C. is 0.2% or less and a thermal expansion coefficient at a temperature of 400° C. is in a range of 0.1% to 0.4%, and, representative examples of the ceramic may include at least one selected from silica ($SiO_2$), alumina ($Al_2O_3$), zirconium oxide ($ZrO_2$), and titanium oxide ($TiO_2$).

The polymer resin and the ceramic may be used by being mixed in a weight ratio of 80:20 to 100:0, and, in a case in which an amount of the ceramic is greater than 20 wt %, it is disadvantageous in that the ceramic is difficult to be molded into a gasket.

The CID gasket 137 may be formed by insert injection molding.

Thereafter, during the assembly of the top cap, the top cap may be integrally assembled by inserting the CID filter into the CID gasket.

Also, in the cap assembly of the present invention, the protrusion of the top cap 131, the notch of the safety vent 133, the protrusion of the CID filter 135, and the opening of the CID gasket 137 may be disposed at positions communicating with each other in a straight line (see FIG. 3A).

Furthermore, the cap assembly of the present invention comprising the top cap 131, the safety vent 133, the CID filter 135, and the CID gasket 137 may be integrally formed by a crimping gasket 139 for maintaining air tightness (see FIG. 3B).

In this case, since there is a high possibility of leakage of the electrolyte or gas from an interface region between the cap assembly and the crimping gasket, particularly, an interface region between the safety vent and the crimping gasket as described above, an uneven portion for preventing can-partial leakage, which is formed on any one surface of a surface of the case in contact with the gasket and a surface of the gasket in contact therewith, may be further included. As a result, the safety of the battery may be significantly improved by preventing the leakage of the electrolyte or gas from the interface therebetween until the safety vent is short-circuited.

Also, the present invention provides a cylindrical secondary battery including:

an electrode assembly composed of a negative electrode, a positive electrode, and a separator;

a battery can having an opening at one side thereof and accommodating the electrode assembly and an electrolyte through the opening; and a cap assembly sealing the opening of the battery can, wherein the cap assembly includes a safety vent having a predetermined notch configured to be ruptured by high pressure gas generated in the battery; a current interrupt device (CID) coupled to a lower end of the safety vent, blocking a current when an internal pressure of the battery rises, and relieving the internal pressure; and a CID gasket surrounding an outer circumferential surface of the current interrupt device, and the CID gasket comprises a polymer resin having a melting point of 250° C. or more and a heat deflection temperature (HDT) of 200° C. or more, or a composite of the polymer resin and ceramic.

In the cylindrical secondary battery of the present invention, the negative electrode is prepared by coating an electrode plate for manufacturing a negative electrode plate with a negative electrode active material, and typical examples of the negative electrode plate may be copper, stainless steel, aluminum, nickel, titanium, fired carbon, copper or stainless steel that is surface-treated with one of carbon, nickel, titanium, silver, or the like, an aluminum-cadmium alloy, or the like. Also, the negative electrode plate may have a fine roughness surface to improve bonding strength with the negative electrode active material, and may have various shapes such as a film, a sheet, a foil, a net, a porous body, a foam body, a non-woven fabric body, and the like.

As the negative electrode active material, carbon such as hard carbon and graphite-based carbon; a complex metal oxide such as $Li_xFe_2O_3$ ($0 \leq x \leq 1$), $Li_xO_2$ ($0 \leq x \leq 1$), $Sn_xMe_{1-x}$ $Me'_yO_z$ (Me: manganese (Mn), iron (Fe), lead (Pb), or germanium (Ge); Me': aluminum (Al), boron (B), phosphorous (P), silicon (Si), Groups I, II and III elements, or halogen; $0 < x \leq 1$; $1 \leq y \leq 3$; $1 \leq z \leq 8$); a lithium metal; a lithium alloy; a silicon-based alloy; a tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene; or a Li—Co—

Ni-based material may be used. The negative electrode active material may selectively include a conductive agent and a binder.

In the cylindrical secondary battery of the present invention, the positive electrode is prepared by coating an electrode plate for manufacturing a positive electrode plate with a positive electrode active material, typical examples of the positive electrode plate may be stainless steel, aluminum, nickel, titanium, fired carbon, or aluminum or stainless steel that is surface-treated with one of carbon, nickel, titanium, silver, or the like, and the positive electrode plate may have various shapes such as a film, a sheet, a foil, a net, a porous body, a foam body, a non-woven fabric body, and the like.

Also, the positive electrode active material may include a layered compound such as lithium cobalt oxide ($LiCoO_2$) and lithium nickel oxide ($LiNiO_2$), or a compound substituted with at least one transition metal; a lithium manganese oxide such as the chemical formula $Li_{1+x}Mn_{2-x}O_4$ (where x ranges from 0 to 0.33), $LiMnO_3$, $LiMn_2O_3$, and $LiMnO_2$; lithium copper oxide ($Li_2CuO_2$); vanadium oxide such as $LiV_3O_8$, $LiFe_3O_4$, $V_2O_5$, and $Cu_2V_2O_7$; Ni-site type lithium nickel oxide represented by the chemical formula $LiNi_{1-x}M_xO_2$ (where M is cobalt (Co), Mn, Al, copper (Cu), Fe, magnesium (Mg), B, or gallium (Ga), and x ranges from 0.01 to 0.3); lithium manganese complex oxide represented by the chemical formula $LiMn_{2-x}M_xO_2$ (where M is Co, nickel (Ni), Fe, chromium (Cr), zinc (Zn), or tantalum (Ta), and x ranges from 0.01 to 0.1) or $Li_2Mn_3MO_8$ (where M is Fe, Co, Ni, Cu, or Zn); $LiMn_2O_4$, with a part of lithium (Li) of a chemical formula being substituted with alkaline earth metal ions; a disulfide compound; and $Fe_2(MoO_4)_3$, but the present invention is not limited thereto. The positive electrode active material may selectively include a conductive agent and a binder.

In the cylindrical secondary battery of the present invention, a typically used insulating thin film having high ion permeability and mechanical strength may be used as the separator disposed between the positive electrode and the negative electrode, and, for example, an olefin-based polymer such as chemical resistant and hydrophobic polypropylene; and a sheet or nonwoven fabric formed of glass fibers or polyethylene are used. In a case in which a solid electrolyte, such as a polymer, is used as an electrolyte, the solid electrolyte may also serve as the separator.

In the cylindrical secondary battery of the present invention, the electrolyte is a lithium salt-containing non-aqueous electrolyte, wherein a liquid non-aqueous electrolyte, an organic solid electrolyte, or an inorganic solid electrolyte is used. Specifically, examples of the liquid non-aqueous electrolyte may be an aprotic organic solvent, such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydroxyfuran, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate.

Examples of the organic solid electrolyte may be a polyethylene derivative, a polyethylene oxide derivative, a polypropylene oxide derivative, a phosphate ester polymer, poly agitation lysine, polyester sulfide, polyvinyl alcohol, polyvinylidene fluoride, and a polymer containing an ionic dissociation group.

Examples of the inorganic solid electrolyte may be nitrides, halides, and sulfates of Li, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the non-aqueous electrolyte and for example, may include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imide.

Also, in order to improve charge/discharge characteristics and flame retardancy, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, and aluminum trichloride, for example, may be added to the lithium salt-containing non-aqueous electrolyte. In some cases, halogen-containing solvents, such as carbon tetrachloride and ethylene trifluoride, may be further included in order to impart incombustibility, and carbon dioxide gas may be further included in order to improve high-temperature storage characteristics.

In this case, techniques and configurations for the preparation of a typical cylindrical secondary battery may be used without limitation for other components for the preparation of the cylindrical secondary battery, except the CID gasket material constituting the cap assembly in the present invention, and preparation method, and, since the details are well-known to those skilled in the art, detailed descriptions will be omitted.

As described above, since the cylindrical secondary battery of the present invention has the cap assembly which includes the CID gasket comprising the polymer resin having a melting point of 250° C. or more and a heat deflection temperature (HDT) of 200° C. or more, the cylindrical secondary battery of the present invention may instantaneously provide a high output when the cylindrical secondary battery is used as a power source of a power tool, such as an electric drill, and may be stable to external physical impacts such as vibration and drop. In particular, a cylindrical secondary battery having high stability may be provided by solving the problem that the current is reconnected due to the melting of the CID gasket during an external short circuit in high-power cells for an power tool, an E-bike, and a vacuum cleaner having a top cap structure without a PTC element.

Although the present invention has been described with reference to some embodiments, it should be understood that the foregoing embodiments are provided for illustration only and are not to be construed in any way as limiting the present invention, and that various modifications and applications can be made by those skilled in the art without departing from essential characteristics of the present embodiments. For example, each component described in the embodiments of the present invention can be modified in various forms. In addition, differences relating to these modifications and applications are to be construed as within the scope of the invention defined in the appended claims.

EXAMPLES

Example 1

CID Assembly Preparation

Six through holes having a width of 0.6 mm and a circumferential length of 2.61 mm were perforated at a distance of 1.5 mm from the center of a central protrusion, and a notch having a thickness of about 70 μm was formed at each bridge connecting the through holes to prepare a CID filter.

A circular ring-shaped film comprising poly(tetrafluoroethylene-co-perfluoro(propylvinyl ether) (CAS No. 26655-00-5) and having a central opening was disposed on an outer circumferential surface of the CID filter, and was heat-welded at 230° C. for 3 seconds to prepare a CID assembly in which the CID filter and a CID gasket were integrally formed.

Cap Assembly Preparation

A first notch having a diameter of 9.6 mm and a thickness of 0.1 mm was formed in an aluminum sheet having an outer diameter of 16 mm and a thickness of 0.3 mm, a second notch having a diameter of 4 mm and a thickness of 0.06 mm was formed, and a safety vent was then prepared so as to have a center of a recessed portion protruding downward to a depth of 0.65 mm.

Also, six through holes having a diameter of 1.5 mm were radially perforated in an aluminum sheet having an outer diameter of 11 mm and a thickness of 0.5 mm, and a protrusion having a diameter of 1.53 mm and a protrusion height of 0.20 mm was formed at the center to prepare a top cap.

The above prepared top cap, safety vent, and CID assembly were stacked so that a protrusion of the safety vent, in which the protrusion was included at the center, was aligned to the center and heat-fused at 230° C. for 2 seconds, and an epoxy resin was then melted and coated on an outer circumferential surface of the stack. Before the epoxy resin was hardened, the top cap, safety vent, and CID assembly were surrounded by a crimping gasket to prepare a cap assembly (see FIGS. 3A and 3B).

Cylindrical Secondary Battery Preparation

A jelly-roll type electrode assembly, in which a polyethylene porous separator was disposed between a positive electrode formed of lithium cobalt oxide and a negative electrode formed of graphite, was inserted into a cylindrical can, and a top surface of the can was then fixed by beading.

The cap assembly was inserted into the beading portion and the gasket was crimped by inwardly pressing a top end of the can to finally prepare a cylindrical secondary battery.

Comparative Example 1

A cap assembly and a cylindrical secondary battery including the same were prepared in the same manner as in Example 1 except that the CID gasket was prepared by using a polybutylene terephthalate resin.

Experimental Examples

Experimental Example 1

The secondary battery prepared in Example 1 and the secondary battery prepared in Comparative Example 1 were externally short-circuited with a variable resistor of 6.4 mohm to 95 mohm in room temperature and 55° C. atmospheres. Subsequently, an internal temperature of each battery was increased to 200° C. or more, and it was then confirmed whether a current connection, in which the current flowed again into the cell, reoccurred or not.

Figure 4A:
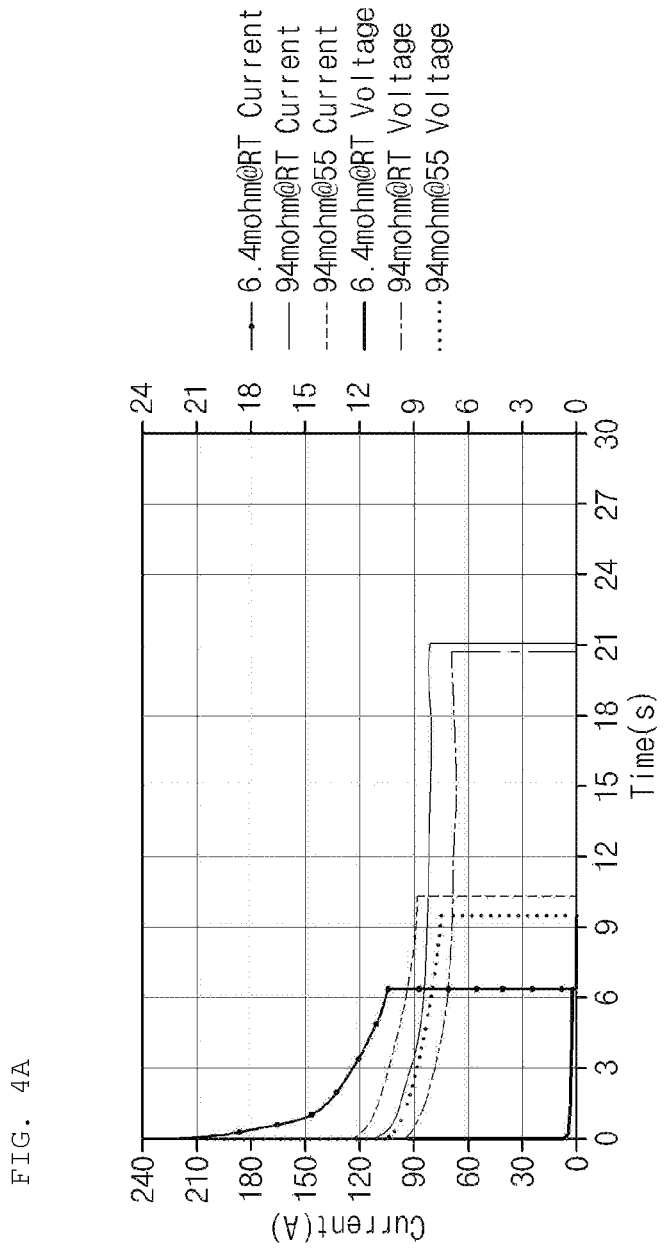
FIGS. 4A and 4B are graphs in which whether the current is connected during an external short circuit of a secondary battery of Example 1 or not is measured.
Figure 4B:
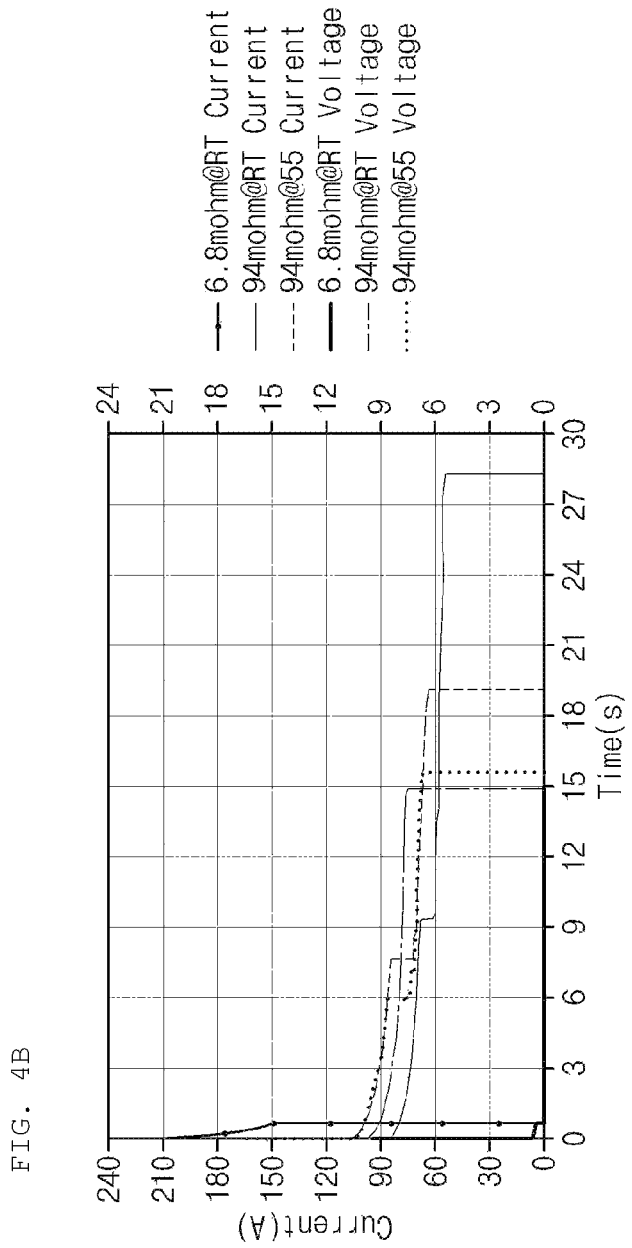

Referring to FIGS. 4A and 4B, with respect to the secondary battery which had the cap assembly including the CID gasket formed of poly(tetrafluoroethylene-co-perfluoro(propylvinyl ether) of Example 1, it may be understood that, since the melting of the CID gasket was prevented, the current flow did not reoccur.

Figure 5:
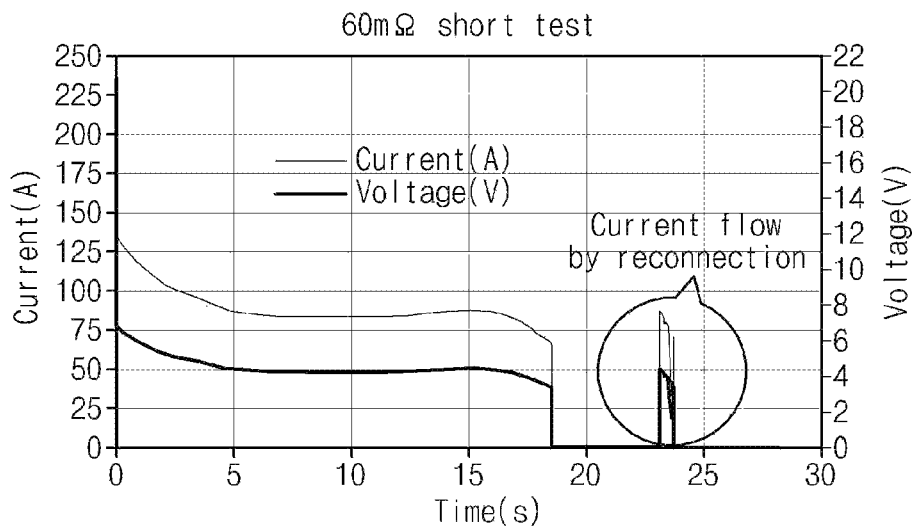
FIG. 5 is a graph showing a phenomenon in which the current is reconnected during an external short circuit of a secondary battery of Comparative Example 1.

In contrast, referring to FIG. 5, with respect to the secondary battery including the CID gasket formed of the polybutylene terephthalate resin of Comparative Example 1, it may be confirmed that, since the reconnection due to the melting of the CID gasket occurred, the current was connected.

Experimental Example 2

The cylindrical batteries prepared in Example 1 were externally short-circuited with a resistance of 10 mohm, 50 mohm, and 100 mohm, respectively, and temperatures of a + electrode portion (C1) on which the cap assembly of each cylindrical battery was disposed, a middle portion (C2) of the cylindrical battery, and a − electrode portion (C3) corresponding to a bottom portion of the cylindrical battery were then measured, and the results thereof are presented in the following FIGS. 6A to 6C, respectively.

Figure 6A:
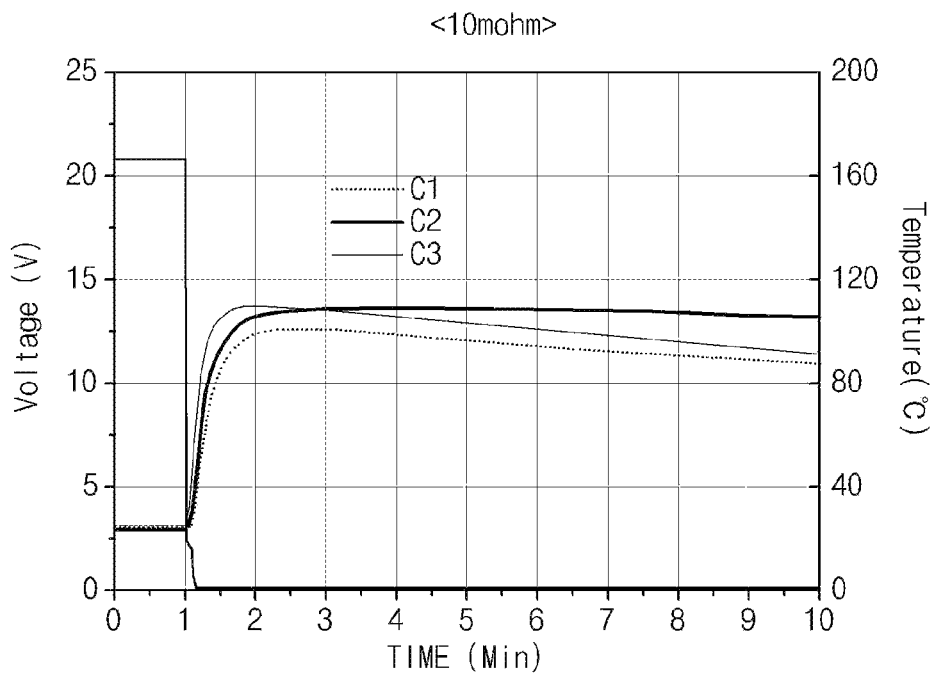
FIGS. 6A to 6C are graphs showing changes in temperatures of a surface of a cell during the external short circuit of the secondary battery of Example 1.
Figure 6B:
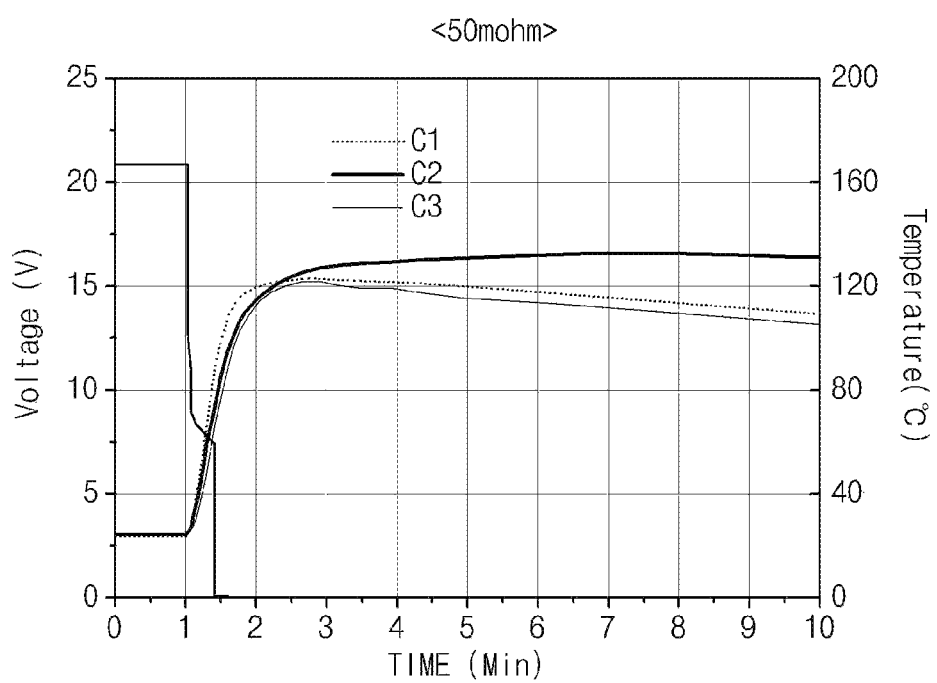
Figure 6C:
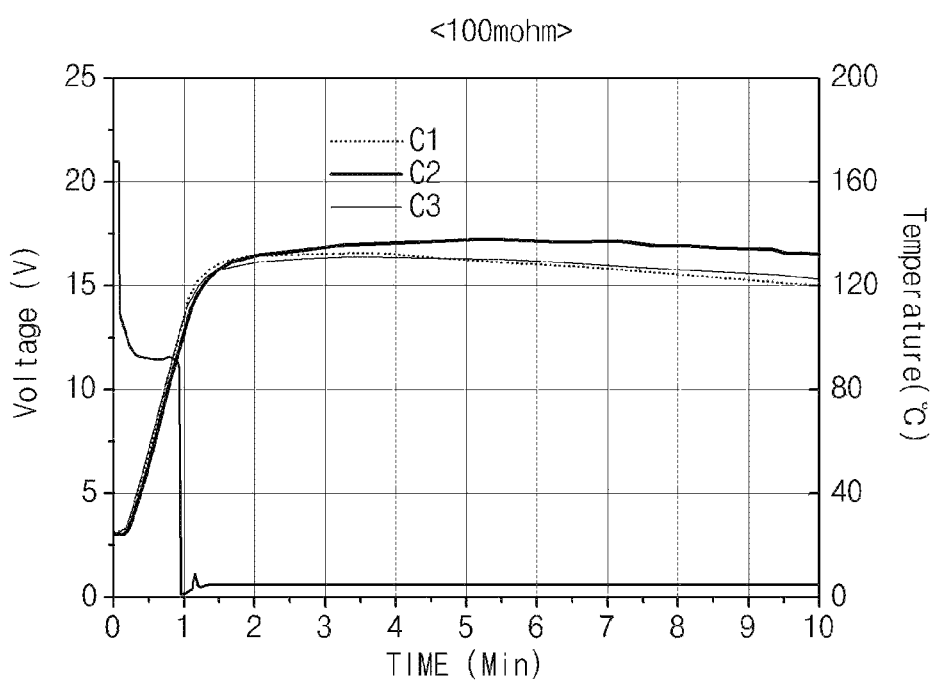

Referring to FIGS. 6A to 6C, the temperature of the surface of the battery was not significantly changed even at high resistance, and, accordingly, it may be predicted that the melting of the CID gasket did not occur.

The invention claimed is:

1. A cap assembly for a cylindrical secondary battery, which is mounted on a top end portion of the cylindrical secondary battery having a structure in which an electrode assembly is placed in a cylindrical can, the cap assembly comprising:
    a safety vent having a predetermined notch configured to be ruptured by high pressure gas generated in the battery;
    a current interrupt device coupled to a lower end of the safety vent and blocking a current when an internal pressure of the battery rises; and
    a gasket for the current interrupt device surrounding and directly contacting an outer circumferential surface of the current interrupt device,
    wherein the gasket for the current interrupt device comprises a composite of a polymer resin and a ceramic material, the polymer resin having a melting point of 250° C. or more and a heat deflection temperature of 200° C. or more, the polymer resin comprising at least one polymer resin selected from the group consisting of a perfluoroalkoxy resin and a thermoplastic polyester elastomer (TPEE) having a weight-average molecular weight of 10,000 to 500,000, and
    wherein the gasket for the current interrupt device has an opening at a center thereof such that the gasket for the current interrupt device does not block through holes of the current interrupt device.

2. The cap assembly for a cylindrical secondary battery of claim 1, wherein the perfluoroalkoxy resin comprises a copolymer of tetrafluoroethylene and perfluoroalkyl vinyl ether.

3. The cap assembly for a cylindrical secondary battery of claim 2, wherein the copolymer of tetrafluoroethylene and perfluoroalkyl vinyl ether comprises at least one selected from the group consisting of poly(tetrafluoroethylene-coperfluoro(methylvinyl ether)), poly(tetrafluoroethylene-co-perfluoro(ethylvinyl ether)), and poly(tetrafluoroethylene-co-perfluoro(propylvinyl ether)).

4. The cap assembly for a cylindrical secondary battery of claim 1, wherein the cap assembly has a stack structure in which the current interrupt device, the gasket for the current interrupt device, the safety vent, and a top cap having at least one gas outlet formed therein are stacked, and a crimping gasket is further mounted on an outer circumferential surface of the stack structure.

5. The cap assembly for a cylindrical secondary battery of claim 4, wherein the safety vent, the current interrupt device, and the gasket for the current interrupt device are disposed to communicate with each other in a straight line.

6. The cap assembly for a cylindrical secondary battery of claim 1, wherein the safety vent, the current interrupt device, and the gasket for the current interrupt device are disposed to communicate with each other in a straight line.

7. The cap assembly for a cylindrical secondary battery of claim 1, wherein the ceramic material includes at least one selected from the group consisting of: silicon (Si), aluminum (Al), zirconium (Zr), titanium (Ti), and insulating oxides, nitrides, hydroxides, alkoxides, and ketones of each of such elements.

8. The cap assembly for a cylindrical secondary battery of claim 7, wherein the ceramic material includes at least one selected from the group consisting of: silica ($SiO_2$), alumina ($Al_2O_3$), zirconium oxide ($ZrO_2$), and titanium oxide ($TiO_2$).

9. The cap assembly for a cylindrical secondary battery of claim 1, wherein the ceramic material includes a material in which a thermal expansion coefficient at a temperature of 200° C. is 0.2% or less and in which a thermal expansion coefficient at a temperature of 400° C. in a range of 0.1% to 0.4%.

10. The cap assembly for a cylindrical secondary battery of claim 1, wherein the polymer resin has a weight ratio to the ceramic material in the composite that is greater than or equal to 80:20.

11. A cylindrical secondary battery comprising:
an electrode assembly comprising a negative electrode, a positive electrode, and a separator;
a battery can having an opening at one side thereof and accommodating the electrode assembly and an electrolyte through the opening; and
the cap assembly of claim 1 sealing the opening of the battery can.

* * * * *